(12) United States Patent
Andersen

(10) Patent No.: US 9,132,432 B2
(45) Date of Patent: Sep. 15, 2015

(54) ISOTROPIC QUANTIZATION SORTING SYSTEMS OF AUTOMOBILE SHREDDER RESIDUE TO ENHANCE RECOVERY OF RECYCLABLE MATERIALS

(75) Inventor: Dean R. Andersen, Greeley, CO (US)

(73) Assignee: Dean Andersen Trust, Greeley, CO (US)

( * ) Notice: Subject to any disclaimer, the term of this patent is extended or adjusted under 35 U.S.C. 154(b) by 279 days.

(21) Appl. No.: 13/556,069

(22) Filed: Jul. 23, 2012

(65) Prior Publication Data

US 2013/0092609 A1    Apr. 18, 2013

Related U.S. Application Data

(63) Continuation-in-part of application No. 13/274,328, filed on Oct. 15, 2011, now Pat. No. 8,226,019.

(51) Int. Cl.
*B03B 9/06* (2006.01)
*B29B 17/02* (2006.01)
*B29L 31/30* (2006.01)

(52) U.S. Cl.
CPC .............. *B03B 9/061* (2013.01); *B29B 17/02* (2013.01); *B03B 2009/068* (2013.01); *B29B 2017/0234* (2013.01); *B29L 2031/3055* (2013.01); *Y02W 30/521* (2015.05); *Y02W 30/524* (2015.05); *Y02W 30/525* (2015.05); *Y02W 30/526* (2015.05); *Y02W 30/622* (2015.05)

(58) Field of Classification Search
CPC .... B03B 9/061; B03B 2009/068; B07B 9/00; B07B 13/04; B29B 17/0234
USPC ......... 209/24–37, 133–139.1, 930; 241/24.12
See application file for complete search history.

(56) References Cited

U.S. PATENT DOCUMENTS

| | | |
|---|---|---|
| 1,953,948 A | 4/1934 | Bieth |
| 2,978,103 A | 4/1961 | Cowher, Sr. |
| 3,042,202 A | 7/1962 | Work |
| 3,643,797 A | 2/1972 | Berkowitz et al. |

(Continued)

FOREIGN PATENT DOCUMENTS

WO    2013055425 A1    4/2013

OTHER PUBLICATIONS

International Application No. PCT/US2012/047882; International Search Report dated Jan. 8, 2013.

(Continued)

*Primary Examiner* — Joseph C Rodriguez
(74) *Attorney, Agent, or Firm* — Santangelo Law Offices, P. C.

(57) ABSTRACT

Systems and methods for increasing recyclable material recovery from automobile shredder residue (4). Embodiments include separation of automobile shredder residue with a sorting system (5) such as an air sorting system, a non-ferrous automobile shredder residue air sorter, an air-locked automobile shredder residue sorting system, a non-magnetic magnetic sorter, a substantially isotropic quantization sorting system, an air-locked Z-box air classifier, low susceptance microparticle separator, a magnetic fuzz separator, a wind tunnel system, or the like perhaps with substantially horizontal laminar air flow (7) and can be used with or without out other traditional automobile shredder residue sorting systems (16) or (15) perhaps creating additional recyclable quantities and even better separated results such as with zorba and zurik and the like.

22 Claims, 3 Drawing Sheets

(56) References Cited

U.S. PATENT DOCUMENTS

| | | | |
|---|---|---|---|
| 3,682,302 | A | 8/1972 | Bernutat |
| 3,848,813 | A | 11/1974 | Stanczyk et al. |
| 3,856,217 | A | 12/1974 | Brewer |
| 3,972,481 | A | 8/1976 | Naporano et al. |
| 3,972,808 | A | 8/1976 | Manley |
| 4,034,861 | A * | 7/1977 | Fontein et al. ............. 209/10 |
| 4,036,441 | A * | 7/1977 | Basten et al. ............. 241/20 |
| 4,139,454 | A | 2/1979 | Larson |
| 4,312,748 | A | 1/1982 | Rozmus |
| 4,313,910 | A | 2/1982 | Dries et al. |
| 4,378,234 | A | 3/1983 | Suzuki et al. |
| 4,418,871 | A | 12/1983 | Powell |
| 4,692,167 | A | 9/1987 | Levasseur |
| 4,721,457 | A | 1/1988 | Areaux et al. |
| 4,844,351 | A * | 7/1989 | Holloway ............. 241/14 |
| 4,891,129 | A | 1/1990 | Barnes |
| 4,894,148 | A | 1/1990 | Frei |
| 5,032,256 | A | 7/1991 | Vickery |
| 5,080,291 | A * | 1/1992 | Bloom ............. 241/19 |
| 5,443,157 | A | 8/1995 | Baker et al. |
| 5,535,891 | A * | 7/1996 | Kuniyone et al. ............. 209/12.1 |
| 5,938,803 | A | 8/1999 | Dries |
| 6,070,733 | A * | 6/2000 | Osing ............. 209/8 |
| 6,422,493 | B1 | 7/2002 | Simon et al. |
| 6,830,734 | B1 | 12/2004 | Dirske et al. |
| 6,846,463 | B1 | 1/2005 | Dries et al. |
| 7,108,138 | B2 | 9/2006 | Simpson |
| 7,389,880 | B2 * | 6/2008 | Goldmann et al. ............. 209/12.1 |
| 7,905,946 | B1 | 3/2011 | Weislogel et al. |
| 8,201,694 | B2 | 6/2012 | Molteni |
| 8,226,019 | B2 | 7/2012 | Andersen |
| 2001/0048039 | A1 | 12/2001 | Simon et al. |
| 2003/0129077 | A1 | 7/2003 | Koch et al. |
| 2003/0213859 | A1 * | 11/2003 | Simon et al. ............. 241/19 |
| 2006/0243645 | A1 | 11/2006 | Josephs |
| 2007/0187299 | A1 | 8/2007 | Valerio |
| 2012/0032008 | A1 | 2/2012 | Andersen |

OTHER PUBLICATIONS

International Application No. PCT/US2012/047882; Written Opinion of the International Searching Authority dated Jan. 8, 2013.
Scrap, vol. 68, No. 3, May/Jun. 2011.
Scrap Specification Circular, Institute of Scrap Recycling Industries, Inc., Apr. 7, 2008.
Eddy current separator for metal separation, www.cogelme.com/eng/e-eddy-current-metal-separator-htm, printed Oct. 11, 2011.
General Kinematics, Dual-Knife De-Stoner Air classifier; www.generalkinematics.com/recycling/proddesc.cfm/productid/105, 2 pages, printed Feb. 7, 2012.
General Kinematics, Single Knife De-Stoner Air classifier; www.generalkinematics.com/recycling/proddesc.cfm/productid/29, 2 pages, printed Feb. 7, 2012.
Triple/S Dynamics, Inc. www.sssdynamics.com Stoner Model S-30J, 2 pages printed Feb. 7, 2012.
Triple/S Dynamics, Inc. www.sssdynamics.com Pace Stoner Model S-25, 2 pages printed Feb. 7, 2012.
Triple/S Dynamics, Inc. www.sssdynamics.com Stoner Model S-22H, 2 pages printed Feb. 7, 2012.
Airsort, Highly Accurate Z-box Air Classifier; Sicon brochure received on Apr. 18, 2012 at the ISRI Convention and Exposition in Las Vegas from Apr. 15-19, 2012; 2 Pgs.
McKenna, L. Clean Fractions; Recycling Today, Jul. 2012.
Parent US Nonprovisional U.S. Appl. No. 13/274,328, filed Oct. 15, 2011.
International Preliminary Report on Patentability; International Application No. PCT/US2012/047882; Applicant: Dean Andersen Trust; including Written Opinion of the International Searching Authority; dated Apr. 24, 2014; 24 pages.
Scrap, p. 5, Jan. 9, 2014.
"End-to-End Metal Recovery Solutions"; Eriez Magenetics Ferrous Recovery; http://ferrousrecovery.eriez.com/; website; (c) 2012 Eriez Manufacturing Co.; Jun. 8, 2012, 2 pages.
Curt Harler; "Ohio Oil Patch"; Technology Focus; Summer 2012; pp. 25-28.

* cited by examiner

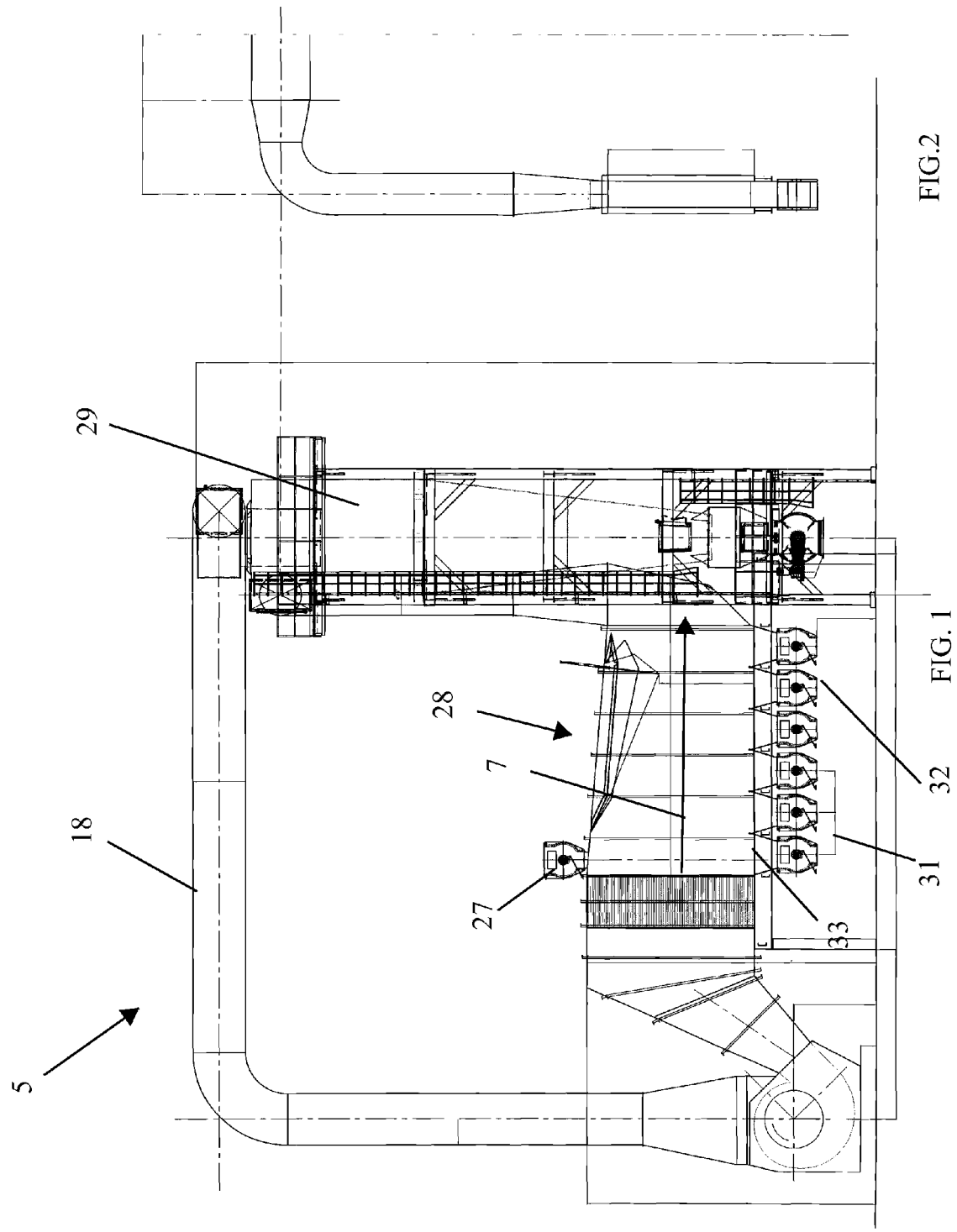

ISOTROPIC QUANTIZATION SORTING SYSTEMS OF AUTOMOBILE SHREDDER RESIDUE TO ENHANCE RECOVERY OF RECYCLABLE MATERIALS

This application is a continuation-in-part of U.S. application Ser. No. 13/274,328 filed Oct. 15, 2011 hereby incorporated by reference herein in its entirety.

FIELD OF THE INVENTION

The present invention relates to systems and methods for enhanced recovery of recyclable materials from automobile shredder residue. More specifically, the present invention relates to removal of magnetic fuzz from automobile shredder residue, air sorting systems of automobile shredder residue, substantially isotropic quantization sorting systems of automobile shredder residue, or the like as discussed herein providing additional recyclable materials, less waste, and even better quality of the separated products.

BACKGROUND OF THE INVENTION

Recycling may be a key component of modern waste reduction and may help sustain the environment for future generations. Recycling efforts can prevent waste of potentially useful materials, reduce the consumption of raw materials, reduce energy usage, and the like. According to estimates from the automotive industry, 95% of all motor vehicles removed from service are processed for recycling. This equates to approximately 9 to 10 million vehicles each year in the US. In the recycling process, cars may be dismantled and stripped of reusable parts. The stripped cars may be sent to auto shredding operations where automobile shredders such as hammermills crush them into smaller pieces. Metal chunks are recovered and sold to metal scrap and nonferrous metal processing industries. On average 75% of a vehicle by weight is recycled. The remaining 25% of the vehicle is commonly landfilled. Major household appliances can also be recycled but create residues that cannot be recycled. The remaining material from the recycling of automobiles, trucks, buses and common household appliances such as washers, dryers and refrigerators and the like is called automobile shredder residue also known as auto fluff, or auto shredder fluff. It is estimated that 2 billion pounds of automobile shredder residue are generated annually.

Realistically, automobile shredder residue contains recyclable components such as plastics and metals mixed in with trash and magnetic fuzz. It is desirable to provide a system that can further process automobile shredder residue to separate the recyclable components in a form that can be used for recycling. Previous particle classification systems such as discussed in U.S. Pat. No. 3,972,808 to Manley and U.S. Pat. No. 4,312,748 to Rozmus, both hereby incorporated by reference herein, would not work with automobile shredder residue among other reasons. Manley was designed for mineral and mine run materials and Rozmus was designed for powders and metal powders. Unlike automobile shredder residue, minerals, mine run minerals, and powders may be somewhat homogenous pre-classification. Automobile shredder residue may be a seemingly homogenous substance but may actually have a lot of various materials and maybe somewhat heterogeneous containing different substances such as glass, fabric, metals, dirt, plastics, rubber, trash, and the like. Separation of automobile shredder residue is very different from minerals, mine run materials, and powders.

Other systems have been developed to recover recyclable components from automobile shredder residue. Such traditional systems include magnets, eddy current, air separation perhaps only as an air sensor puff, flotation, screening, sensor sorting, induction sensor sorting, and X-ray. However, these traditional systems still produce end products that contain recyclable components which end up as waste in a landfill. The traditional sorting systems for automobile shredder residue also provide recyclable products which may be unclean and even unusable perhaps making the recycling process less efficient. Therefore, there is a need for a system to enhance separation of recyclable materials from auto shredder residue to provide cleaner recyclable products and more recyclable products from what would otherwise be trashed.

Unlike past systems which may only afford incremental increases in the recovery of recyclable materials from auto shredder residue, the present invention utilizes techniques which were not previously considered to achieve impressive sorting results compared to the prior art.

SUMMARY OF THE INVENTION

The present invention discloses systems for various sorting of automobile shredder residue. As one example, a wind tunnel system may be provided so that materials such as automobile shredder residue can be effectively sorted into various collections including but not limited to collections of substantially isotropic quantized materials.

It is therefore broadly an object of the present invention to provide methods and systems to increase sorting of recyclable materials from automobile shredder residue to reduce waste and landfill.

It is another object of the present invention to provide cleaner recyclable materials from the sorting of automobile shredder residue to perhaps increase efficiency in the recycling process.

It is yet another object of the present invention to provide a wind tunnel sorting system for separation of recyclable materials from automobile shredder residue.

Another object of the present invention provides an air-locked automobile shredder residue sorting system.

It is yet another object of the present invention to provide a directed air flow automobile shredder residue sorting system.

It is another objection of the present invention to provide air sorting of non-ferrous recovery components perhaps with a non-ferrous recovery system having an automobile shredder residue sorting system.

It is yet another objection of the present invention to provide substantial removal of magnetic fuzz from automobile shredder residue.

It is another object of the present invention to provide non-magnetically magnetic sorting of automobile shredder residue.

It is yet another object of the present invention to provide automobile shredder residue sorting systems of trash items.

Another object of the present invention provides the use of sorting systems of the present invention together with other traditional systems.

It is another object of the present invention to process automobile shredder residue in a various unique separation systems and apparatus and then process with subsequent sorting systems.

It is yet another object of the present invention to process automobile shredder residue in initial sorting systems and then process with various unique automobile shredder residue separation systems.

It is another object of the present invention to provide enhanced recyclable materials recovered from automobile shredder residue including recyclable metals and plastics.

Naturally, further objects of the invention are disclosed throughout other areas of the specification, drawings, and claims.

BRIEF DESCRIPTION OF THE DRAWINGS

The following description and referenced drawings are for selected embodiments of the present invention. Naturally, changes may be made to the disclosed embodiments while still falling within the scope and spirit of the present invention.

FIG. 1 shows an embodiment of the invention of a sorting system.

FIG. 2 shows an end view of a sorting system.

DETAILED DESCRIPTION OF THE PREFERRED EMBODIMENTS

Figure 3:
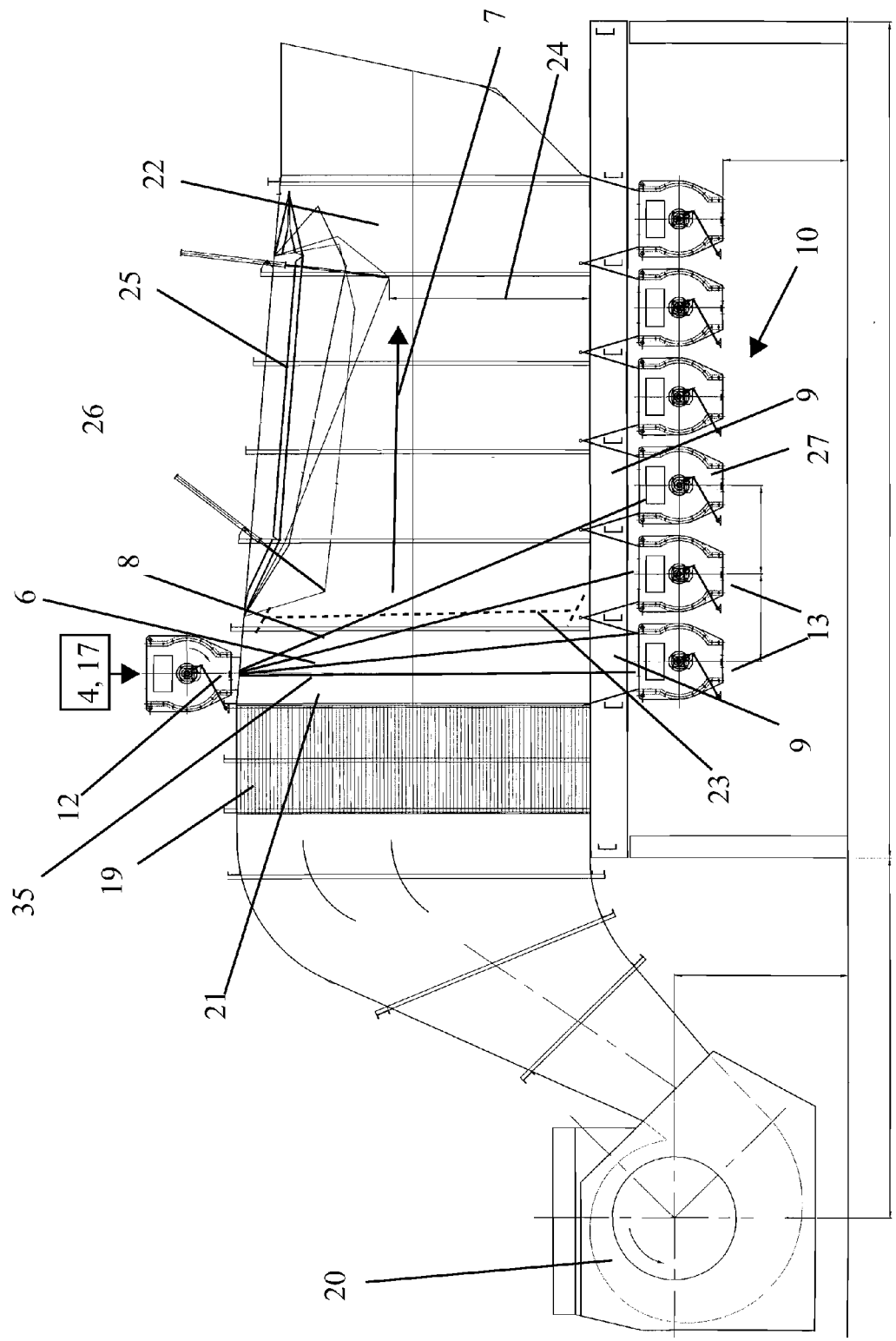
FIG. 3 shows an embodiment of the invention of a wind tunnel.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may provide methods for enhanced separation of automobile shredder residue comprising: providing automobile shredder residue from an automobile shredder and metal reclamation process; introducing said automobile shredder residue into a wind tunnel sorting system; providing a gravitationally driven descent of said automobile shredder residue in said wind tunnel sorting system; horizontally laminar flowing air through said wind tunnel sorting system; dynamically influencing said gravitationally driven descent of at least some of said automobile shredder residue with said horizontally laminar flowing air so that at least some of said automobile shredder residue is carried with said laminar flowing air in said wind tunnel sorting system; substantially isotropic quantization separating said automobile shredder residue in said wind tunnel sorting system by said horizontally laminar flowing air scattering said automobile shredder residue; and perhaps even categorizingly collecting said automobile shredder residue as said automobile shredder residue variably descends in said wind tunnel sorting system.

Apparatus for enhanced separation of automobile shredder residue may include a plurality of automobile shredder residue; a substantially isotropic quantization sorting system; an automobile shredder residue introduction element in said substantially isotropic quantization sorting system; a horizontal laminar air flow in said substantially isotropic quantization sorting system; and perhaps even at least one collection of substantially isotropic quantized materials generated from said automobile shredder residue influenced by said horizontal laminar air flow.

Automobile shredder residue may be the leftover materials from an automobile shredder and metal reclamation process. As may be understood from FIG. 4, shredder materials (26) such as but not limited to automobiles, trucks, buses, household appliances, washers, dryers, refrigerator, sheet metal, scraps, and waste metal may be fed into an automobile shredder system (1) where the shredder material may be shredded into a plurality of shredded pieces (2). A shredder system may include a huge and powerful machine or machines such as a hammermills capable of crushing the shredder materials into smaller pieces. After shredded pieces (2) may be removed from a shredder, metals such as ferrous metals may be separated from the mass of the material with a sorter such as a magnetic sorter (11). A magnetic sorter (11) may be a traditional gross magnetic sorter in that this type of gross magnetic sorting of shredder pieces may be a traditional type of system. A magnetic sorter may be a powerful magnet or plurality of magnets or even a large magnetic roller, or the like. The magnetic sorter may be responsive to the plurality of shredded pieces to generate a collection of ferrous metals (3), such as a ferrous collection of shredded pieces, which may then be recycled. This may be a ferrous recovery system (40). The leftover collection of material may be a separate collection of the automobile shredder residue (4) which may be characterized as a non-ferrous collection of automobile shredder residue or even non-ferrous automobile shredder residue. However, this collection of materials may include ferrous or even magnetic substances but may be termed under the non-ferrous recovery system since it may be the resulting components after the ferrous recovery system. Each of the ferrous collection of shredded pieces or the non-ferrous collection of automobile shredder residue may be collected in a collector such as a container or the like as discussed herein. Most of the recyclable components in automobile shredder residue may be non-ferrous metals (such as stainless steel, copper, brass, zinc, aluminum, lead, and the like) but may also have some ferrous metals mixed in as well. As mentioned, the leftover collection of materials may be processed in a non-ferrous recovery system (41). Automobile shredder residue may include a variety of materials such as but not limited to magnetic fuzz, dirt, non-metallic waste, trash, metals, ferrous metals, nonferrous metals, light trash, heavy trash, glass, plastic, wood, aluminum, copper, zinc, brass, lead, stainless steel, magnesium, nickel, tin, insulated copper wire, any combination thereof, or the like.

Embodiments of the present invention may provide air-locked automobile shredder residue sorting systems. Automobile shredder residue may be size sorted (34) perhaps with a size sorter, to perhaps less than about one inch size cut in some instances or as discussed herein. The sized automobile shredder residue may be introduced into an air-locked automobile shredder residue sorting system, perhaps like the non-limiting example shown in FIG. 1 with air locks (27) in the system. An air-locked system may be desirable perhaps in order to contain the automobile shredder residue due to its nature of containing harmful substances, such as magnetic fuzz, that can be harmful if inhaled, digested, or the like. The automobile shredder residue may be air sorted in an air-locked automobile shredder residue sorting system and at least one sorted collection of sorted automobile shredder residue may be collected. As discussed herein, an automobile shredder residue system may include horizontally flowing air (7), may be in a closed loop (18), may be a wind tunnel system, may be a contained system, or the like, or as discussed herein. A contained system may provide that sorting materials are somehow contained perhaps within an apparatus, within a building, within an air-locked system or the like.

As mentioned previously, an automobile shredder residue sorting system may be used in a non-ferrous recovery system (41). Of course, any kind of sorting system may be used. For example, a Z-box air classifier which is a known traditional system to one skilled in the art, may be adapted into a new system with an air-lock. A Z-box air classifier may function by having heavier components falling down and the lighter components rising up and out of the system. A Z-box air classifier has only been used in the clean-up of ferrous recovery system and may be a density sorting to get rid of trash on steel. A Z-box air classifier may not be a size sorter. In the past, a Z-box air classifier has not been used in a non-ferrous recovery system and may not have been air-locked.

A cyclone, as discussed herein, may be used with an air-locked automobile shredder residue sorting system to perhaps clean the air flow in a sorting system that has some automobile shredder residue substances therein. This may include the lighter substances such as but not limited to magnetic fuzz, light trash, or the like. A cyclone may be located and used after the sorting system such that the automobile shredder residue may be sorted before a cyclone step. A cyclone may be a centrifugal dust removal type system. It may be a density sorter where light components may spin to the inside and heavy components may spin to the outside. It is noted that size sort is different than density sort. Cyclones have not been used in non-ferrous recovery systems in the past. In the past, a cyclone may only have been a Z-box accessory which may only have been used in the ferrous recovery systems.

In other embodiments, an air-locked automobile shredder residue sorting system may provide path directed air sorting of automobile shredder residue perhaps even with an air path directional guide. An air directed flow may not be a cyclone; a cyclone may not be directed air flow, and perhaps even a cyclone may have rotary air flow. Directed air flow may be non-rotary air flow, laminar air flow, non-circular air flow, non-centrifugal air flow, or the like and may be guided, managed, or even regulated air flow.

Embodiments of the present invention may include providing an automobile shredder system (1), producing shredded pieces (2) from the automobile shredder system, traditionally gross magnetically sorting the shredded pieces perhaps with a traditional gross magnetic sorter, providing a collection of ferrous materials which may be collected in a collector as a result of a traditionally gross magnetically sorting process, providing a separate collection of non-ferrous automobile shredder residue which may be collected in a collector as a result of a traditionally gross magnetically sorting process, and perhaps even air sorting the non-ferrous collection of automobile shredder residue perhaps in a non-ferrous automobile shredder residue sorter. As discussed above, a Z-box air classifier which has not been used in a non-ferrous recovery system, surprisingly, may be used on the non-ferrous recovery system processing perhaps as an air sorter of non-ferrous automobile shredder residue. It is noted that in past systems, no one has air sorted materials after the ferrous recovery system or even in a non-ferrous recovery system (e.g., air sorting non-ferrous automobile shredder residue at any point in a non-ferrous recovery system, beginning, intermediate, or end, or the like.) As discussed in more detail herein, an air sorting system may be a laminar air sorter, a horizontal air sorter, a closed system air sorter, a non-magnetic separator of magnetic fuzz from non-ferrous materials, or the like.

In embodiments of the present invention, separation of low susceptance microparticles from automobile shredder residue may be provided perhaps with a low susceptance microparticle separator. Low susceptance microparticles could be magnetic fuzz, iron oxide particles, microparticles, dust, trash, ferromagnetic particles, non- or even anti-ferromagnetic particles or the like and may even be small perhaps less than about one inch in size or the like. Low susceptance microparticles could be disassociated from automobile shredder residue perhaps in that they may be sloughed off or even shook off. Low susceptance microparticles may have low magnetic sensor susceptibility, may be small magnetic particles in size, or may even be non-magnetic or the like. Low susceptance microparticles may be located in a non-ferrous recovery system. Low susceptance microparticles may be magnetically active disassociated particles with low or magnetic or perhaps even low sensor susceptibility, such s but not limited to magnetic fuzz. Susceptance (not meant in a scientific manner) may provide that low magnetic sensor susceptance can be a function of size of the particles, a function of the properties of the particles (magnetic or not) or the like. Magnetic fuzz may have low sensor susceptance (e.g., it may get stuck and may even clog in non-ferrous recovery system processing). Disassociated magnetically active microparticles may be magnetic fuzz because these particles may be difficult to substantially identify. Susceptance may mean magnetic and microparticle may mean low susceptance. Separation of low susceptance microparticles from automobile shredder residue could be any type of system where low susceptance microparticles are separated from the automobile shredder residue including but not limited to a pencil or even small type of magnet. As one non-limiting example, a magnet may be one that may be able to be inserted or stirred in or the like into a collection of non-ferrous components and can pick up substantially only magnetic fuzz. Perhaps even after the small magnetic may pick up the automobile shredder residue particles, they can be brushed off and collected or trashed or the like. This may provide magnetically removing low susceptance microparticles or magnetic fuzz or the like.

Alternatively, a sorting system (5) such as an air sorting system, as discussed herein, may provide non-magnetic separation of low susceptance microparticles from automobile shredder residue perhaps with a low susceptance microparticle separator. This may provide a non-magnetic system to sort magnetic materials as discussed herein. It may be desirable to identify low susceptance microparticles in a system by perhaps visually identification, sensor identification, or the like.

Figure 4:
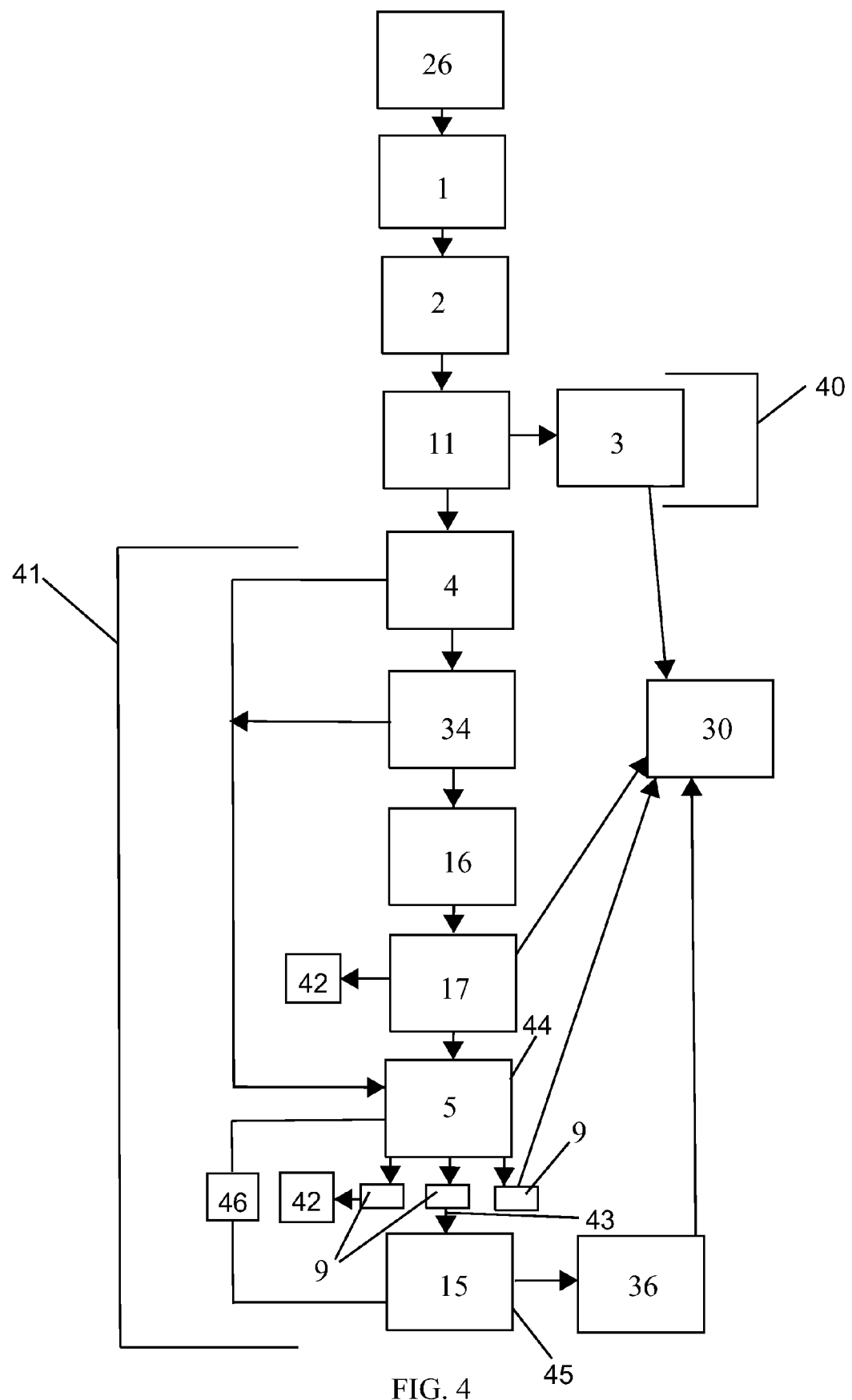
FIG. 4 shows a block diagram of an example of the various processes used with enhanced separation of recyclable products from automobile shredder residue in various embodiments of the present invention.

One of the biggest problems in automobile shredder residue sorting systems may be the magnetic fuzz. As such, the present invention provides, in embodiments, substantially sorting selected magnetic fuzz from automobile shredder residue. As mentioned herein, magnetic fuzz removal from automobile shredder residue may be utilized in the non-ferrous recovery system side of automobile shredder residue processing. As non-ferrous recovery system processing input substances, such as the automobile shredder residue (4) as shown in FIG. 4, may be initially inputted into a non-ferrous recovery system, it may be desirable to remove the magnetic fuzz perhaps to increase efficiencies in the non-ferrous recovery line. Of course, automobile shredder reside non-ferrous recovery system processing input substances may include any inputted components at any step in a non-ferrous recovery system such as but not limited to before sizing, after sizing, before traditional sorting systems, after traditional sorting systems, in between traditional sorting systems, or the like. (Traditional sorting systems include both initial sorting systems and subsequent sorting systems.)

In the past, large magnets may have been used to remove magnetic components from the automobile shredder reside perhaps even in the non-ferrous recovery system. However, while the large magnets could attract at least some magnetic fuzz, it was only with other magnetic components such as steel or the like thus resulting in removal of good recyclable components mixed in with the undesirable magnetic fuzz. Sorting of magnetic fuzz from automobile shredder residue may be run one time perhaps as a single stage sort, may be repeated for a number of times including but not limited to more than about one time, about two times, more than about two times, about three times, more than about three times, about four times, more than about four times, about five times, more than about five times, or more, or the like. As mentioned herein, a Z-box air classifier may be used in the non-ferrous recovery system perhaps even to remove magnetic fuzz from automobile shredder residue non-ferrous recovery system processing input substances. The Z-box air classifier may be used once, may be repeated perhaps for a number of times including but not limited to about two times, about three times, about four times, about five times, more than about one time, more than about two times, more than about three times, more than about four times, more than about five times, or more, or the like. Alternatively, a wind tunnel sorting system, as discussed in various embodiments herein, may be used as a sorter of magnetic fuzz from automobile shredder residue. For example, magnetic fuzz may be a lighter material that may flow through a wind tunnel sorting system and may be captured in a cyclone type environment. In the past, a Z-box air classifier perhaps in conjunction with a cyclone may only have been used in a ferrous recovery system and it was not used to separate out magnetic fuzz.

Embodiments of the present invention may provide non-magnetically magnetic separating automobile shredder residue in an automobile shredder residue sorting system perhaps with a non-magnetic magnetic sorter of automobile shredder residue. Accordingly, the present invention may provide magnetic separation of components (e.g., separating or even substantially separating, magnetic components from non-magnetic components) in automobile shredder residue without using any magnets. This may be done with a wind tunnel sorting system or the like to perhaps separate magnetic fuzz, substantially sorting selected magnetic fuzz, separating light density magnetic fuzz, separating lightly magnetic magnetic fuzz, or the like from automobile shredder residue perhaps even in a non-ferrous recovery system. Light density magnetic fuzz may be particles that are magnetic but may be light in weight. Lightly magnetic magnetic fuzz may be particles that are magnetic but may be weakly magnetic. It is noted that in the past a Z-box air classifier may only be a density sorter (and even only in a ferrous recovery system) and it cannot sort magnetic materials since some of the light materials via a density sort may include both magnetic and non-magnetic components (e.g., aluminum with magnetic fuzz) and heavy materials via a density sort may include both magnetic and non-magnetic components.

As further understood and explained herein, embodiments of the present invention may provide methods of recovering recyclable materials from automobile shredder residue trash comprising providing automobile shredder residue; traditionally separating said automobile shredder residue to provide traditional recyclable materials and traditional end product waste; sorting said traditional end product waste; and perhaps even recovering recyclable materials from said traditional end product waste. An apparatus may include a traditional automobile shredder residue sorter capable of generating traditional recyclable materials and traditional end product waste; and perhaps even an end product waste sorter capable of sorting said traditional end product waste. Thus, surprisingly embodiments of the present invention may provide the ability to recovery recyclable components out of what was traditionally considered trash and was sent to a landfill.

Sorting of traditional end product waste may be with an air sorting automobile shredder system, a density sorting automobile shredder system, a wind tunnel sorting system or the like. Perhaps to provide economic options to some of the automobile shredder facilities, end product waste sorting perhaps with an end product waste sorter may be a miniature or even single capture sorter. This may be a smaller version of a full automobile shredder residue sorter which can provide a less expensive machine. After sorting traditional end product waste, the output thereof may be a salable output such as a salable concentrate. This may be sold for recycling or perhaps even may be sold to a future processing facility and may be called future processing output. It may be that two outputs are generated from a sorter, one that is a trash output and the other that is a salable concentrate output. Of course there may be more than one salable outputs perhaps two or even at least two salable concentrations output or more or the like perhaps even depending on if the sorter is a miniature sorter or a full sorter or the design or the like. In embodiments, sorting of traditional end product waste may be single stage sorting perhaps that it may be sorted one time or alternatively, double stage sorting may be desirable. Of course, one could sort automobile shredder residue or even traditional end product waste as many times as desired.

Some embodiment of the present invention may provide a method of enhanced separation of automobile shredder residue comprising providing a wind tunnel sorting system; air locking said wind tunnel sorting system; introducing automobile shredder residue into said wind tunnel sorting system; providing gravitationally influenced descent of said automobile shredder residue in said wind tunnel sorting system to create a substantially vertical, free-falling flow of residue; flowing air through said wind tunnel sorting system into said substantially vertical, free-falling flow of residue; dynamically influencing said gravitationally influenced descent of at least some of said automobile shredder residue with said flowing air so that at least some of said automobile shredder residue is carried with said flowing air in said wind tunnel sorting system; separating said automobile shredder residue in said wind tunnel sorting system by said flowing air scattering said automobile shredder residue; collecting said automobile shredder residue as said automobile shredder residue variably moves in said wind tunnel sorting system; and perhaps even providing at least one collection of materials. Apparatus may include an air-locked automobile shredder residue wind tunnel sorting system; an air flow in said air-locked automobile shredder residue wind tunnel sorting system configured to influence said automobile shredder residue; and perhaps even at least one collector of sorted automobile shedder residue.

As mentioned, embodiments of the present invention may provide an increased ability to recover recyclable components from trash materials. For example, a method of processing automobile shredder residue may comprise providing automobile shredder residue; traditionally separating said automobile shredder residue to provide traditional recyclable materials and traditional end product waste; sorting said traditional end product waste; providing a collection of landfill substances and a collection of additional processing substances (such as shredder materials (17)) as a result of said step of sorting said traditional end product waste; shipping said collection of said landfill substances to a landfill (42) (as represented in FIG. 4); and perhaps even shipping said collection of said additional processing substances to a separate sorting facility v (45) (as represented in FIG. 4, (43) may include any kind step to which materials are processed for additional sorting). Embodiments may include a traditional automobile shredder residue sorter capable of generating traditional recyclable materials and traditional end product waste; an end product waste sorter capable of sorting said traditional end product waste and configured to provide sorted landfill substances and additional processing substances; a landfill substance collector of said landfill substances from said end product waste sorter; and perhaps even an additional processing substance collector of said additional processing substances from said end product waste sorter. As explained herein, an end product waste sorter could be a wind tunnel sorter, a Z-box air classifier, a limited sorting system perhaps like a miniature or mini-system, or a sorting system as discussed herein or the like.

It may be desirable to economically balance, perhaps with an economic balancer or any kind of evaluator (46) like a balancer or the like a system. Economically balancing may be provided with a computer program, a specialized computer or the like. Balancing may be provided by evaluating the collection of additional processing substances with the collection of landfill substances in that it may need to make economic sense for the processing including sorting, shipping, investment into new machinery as compared to traditional systems and their landfill costs, or the like. For example, it may be desirable to balance shipping costs with a value of additional processing substances perhaps in that shipping costs of the additional processing substances may be less than the disposal costs of the additional processing substances. Alternatively, a separate sorting facility (45) that may receive the additional processing substances may pay the original facility (44) that shipped the additional processing substances for those additional substances perhaps to offset any shipping costs or other factors. It may be desirable to locationally evaluate shipping costs of additional processing substances to a separate sorting facility perhaps with a locational evaluator. For example, a determination of an adequate population base, perhaps with an adequate population evaluator, for a facility that performs a sorting step may be evaluated for dense or sparse supply of trash and generation of traditional end product waste. Further, it may be desirable to evaluate natural boundaries to a separate sorting facility perhaps with a natural boundary evaluator to understand access, travel, shipping, hurdles, boundaries, customs, costs, time, or the like.

Sorting of traditional end product waste may be run once, may be repeated, may be run twice, may be repeated once, may be repeated twice, or more or the like as may be needed. However, a balance of a cost of repeating the sorting of traditional end product waste or any other costs, such as time, internal costs, shipping costs, or the like, may be desirable when evaluating the economics of the processing or system. In some embodiments, it may be desirable to balance a cost of landfill expense with shipping expense and recovery expense perhaps with a cost balancer. Splitting of revenue such as a revenue split of additional processing substances as processed in a separate sorting facility may be used between the separate sorting facility and the original sorting facility and may include but is not limited to a split of 50%:50%; 90%: 10%; 80%:20%; 70%:30%; 60%:40%; 75%:25%, to either facility, e.g., original sorting facility to separate sorting facility or separate sorting facility to original sorting facility, or the like. Of course any kind of split may be used and all are meant to be included in this disclosure. Balancing (46) recovery of additional processing substances with a recycle value of additional processing substances may be evaluated. A shipping paradigm may be transformed, perhaps as the type of container, to change an economic of a shipping paradigm. This may provide elimination of truck load cross contamination or may designate a truck as a dry truck or an additional processing substance truck so that trucks can be utilized for pick up and retrieval of substances more efficiently. For example, an additional processing substance truck may be used to ship additional processing substances from an original sorting facility to a separate sorting facility and may even be used thereafter to ship additional processing substances from a different facility or the like. In embodiments, a re-processor license may be designated between an original sorting facility and a separate sorting facility to perhaps set terms between the two facilities including restrictions or the like. A reduction in sales price of an apparatus that may be capable of limited wind tunnel system sorting of traditional end product waste may be agreed to perhaps when an original sorting facility therein agrees to ship their additional processing substances to the separate sorting facility.

Examples of the Cost Recovery between a full system, a mini system, a local (such as an original) sorting facility, a central (such as a separate sorting facility), and traditional systems are shown in Tables A, B, C, and D.

TABLE A

| ANDERSORT ™ Constituent - Cost Recovery - Comparisons | 33 ton amounts |
|---|---|
| ANDRIK ™ concentrate(avg)/ton = | $180 |
| Landfill/ton = | ($25) |
| Ferrous/ton | $350 |
| ZORBA/lb = | $0.75 |
| ZURIK/lb = | $1.50 |

TABLE B

| | | | ANDERSORT ™ Full System |
|---|---|---|---|
| | 100% | 66800 | Input (⅞" max via std sizing) |
| | | 40960 | Andersort ™ 1st run trash |
| | | 25840 | Input to ERIES |
| $2,130.00 | 4.3% | 2840 | ZORBA via ERIES |
| $ 672.00 | 5.7% | 3840 | Ferrous Recovered via ERIES |
| | | 19160 | Andersort ™ 2nd run input |
| | | 9640 | Andersort ™ 2nd run trash |
| $ 717.50 | 6.1% | 4100 | ferrous nuggets |
| | | 5420 | Andersort ™ 2nd run output |
| $1,422.75 | 9.8% | 948.5 | ZURIK 17.50% |
| | | 4471.5 | Andersort ™ zurik run trash |
| | | 9640 | Andersort ™ 2nd run trash |
| | | 40960 | Andersort ™ 1st run trash (above) |
| ($ 688.39) | 82.4% | 55071.5 | Andersort ™ total trash |
| ($ 321.04) | | | Andersort ™ main license fee 15% |
| $3,932.82 | ANDERSORT ™ Net Dollars | | |

DOLLAR COMPARISON
$3,932.82 ANDERSORT ™ Net Dollars

TABLE C

| ANDERSORT ™ Mini System | | | |
|---|---|---|---|
| LOCAL PROCESSING FACILITY | | | |
|  | 100% | 66800 | Input (⅞" down) |
| $2,130.00 | 4.3% | 2840 | ZORBA |
| $ 672.00 | 5.7% | 3840 | Ferrous Recovered |
|  | 90.0% | 60120 | Andersort ™ Mini input |
| ($ 605.00) | 72.5% | 48400 | Andersort ™ Mini 2X trash |
| $1,054.80 | 17.5% | 11720 | ANDRIK ™ output |
| ($ 158.22) |  |  | Andersort ™ local license fee 15% |
| $3,093.58 | ANDERSORT ™ LOCAL Net Dollars | | |
| CENTRAL SORT FACILITY | | | |
| ($1,054.80) | 100% | 11720 | ANDRIK ™ input |
|  |  | 2200 | Andersort ™ central trash |
|  |  | 9520 |  |
| $ 717.50 | 35.0% | 4100 | ferrous nuggets |
|  |  | 5420 | Andersort ™ 2nd run output |
| $1,422.75 | 8.1% | 948.5 | ZURIK 17.50% |
|  |  | 4471.5 | Andersort ™ zurik run trash |
|  |  | 2200 | Andersort ™ central part 1 trash |
| ($ 83.39) | 56.9% | 6671.5 | Andersort ™ total central trash |
| ($ 321.04) |  |  | Andersort ™ central license fee 15% |
| $ 681.02 | ANDERSORT ™ CENTRAL Net Dollars | | |

$3,093.58 ANDERSORT ™ LOCAL Net Dollars
$681.02 ANDERSORT ™ CENTRAL Net Dollars

TABLE D

| TRADITIONAL SYSTEM | | | |
|---|---|---|---|
|  | 100% | 66800 | Input (⅞" down) |
| $2,130.00 | 4.3% | 2840 | ZORBA best case ERIES Sort (eddy & DSRP) |
| $ 672.00 | 5.7% | 3840 | Ferrous Recovered best case ERIES Sort (eddy & DSRP) |
| ($ 751.50) | 90.0% | 60120 | Traditional Landfill |

$2,050.50 Traditional Net Dollars

Various products may result from the various systems as discussed herein. For example, a product comprising zurik substantially having pieces thereof which are less than about one inch may be provided in embodiments of the present invention. This product may be produced from an air sorter or any other type of method or system. Zurik may be salable zurik, may be produced from a non-ferrous recovery system, may be non-trashy zurik, and may even have a size selected from a group consisting of about ⅞ inch and less than about ⅞ inch. In traditional systems, small cut zurik (perhaps that of less than one inch, ⅞ inch or less or the like) is not available because when processing automobile shredder residue in traditional systems, the zurik product would be too fuzzy and not salable.

In embodiments, a product may be a high copper, mid-sized zurik. It may be a low trash zurik which may be less than about 20% trash by volume or the like. A high copper zurik may include at least about 6% copper or greater than about 6% copper by volume or may even be between about 6% and about 18% copper, up to about 18% copper, up to about 19% copper, up to about 20% copper, up to about 21% copper, and up to about 22% copper by volume, or the like. High copper, mid-sized zurik may have a size of between about one inch and about three inches. Products may be any size, including but not limited to, less than about three inches or the like. In the past, traditional systems may have provided zurik for mid cut with about 6% copper. Also, in past, traditional systems may have provided unclean, trashy copper perhaps with magnetic fuzz therein which may have made it unsalable.

In embodiments, the present invention may provide a product with zorba, zurik, ferrous nuggets, and trash without substantially any magnetic fuzz. This product may be produced from an air sorter or any other method or system. Other products may include a collection of up to about one inch sized automobile shredder residue having an amount of magnetic fuzz that is less than a traditional amount of magnetic fuzz. A traditional amount of magnetic fuzz may be greater than about 10% volume of magnetic fuzz.

Yet other products may provide a collection of up to about one inch sized automobile shredder residue having a percentage of magnetic fuzz therein, said percentage of magnetic fuzz is selected from a group consisting of less than about 10% volume of magnetic fuzz, less than about 9% volume of magnetic fuzz, less than about 8% volume of magnetic fuzz, less than about 7% volume of magnetic fuzz, less than about 6% volume of magnetic fuzz, less than about 5% volume of magnetic fuzz, less than about 4% volume of magnetic fuzz, less than about 3% volume of magnetic fuzz, less than about 2% volume of magnetic fuzz, and less than about 1% volume of magnetic fuzz. Yet even other products may provide a collection of up to about one inch sized automobile shredder residue comprising substantially magnetic fuzz free components. Other products may include any kind of product that may be produced with any of the methods as discussed herein.

In embodiments, the present invention may provide an automobile shredder residue sorting system which provides greater than 10% recycled materials from automobile shredder residue. Traditional sorting in the past may have pulled out about 90% trash leaving about 10% recyclable materials such as but not limited to copper, zorba, zurik, ferrous nuggets, any combination thereof, or the like. In the present invention, embodiments may provide the ability to generate greater than 10% recyclable materials by volume. As one non-limiting example, embodiments of the present invention may provide systems that can pull out about 82.4% trash thus providing about 17.6% recyclable materials.

Embodiments of the present invention may provide a sorting system responsive to and even capable of sorting automobile shredder residues and components within. By responsive, a sorting system may react, may be used with or perhaps even may be desirable for use with automobile shredder residues. A substantially isotropic quantization sorting system may provide sorting of heterogeneous materials into substantially uniform collections perhaps with discrete values or characteristics. Substantially isotropic quantization separating with automobile shredder residues and materials may provide divided subparts which may be discrete, substantially constrained, substantially concentrated, substantially homogenous, or perhaps even substantially categorized from the whole. In one respect, automobile shredder residue may be considered waste prior to sorting and after substantially isotropic quantization sorting, the sorted collections resulting there from may be recyclable perhaps even in the form of zorba, zurik, and the like. Therefore, various embodiments of the present invention may provide a substantially homogenous separation system or even a substantially concentrated separation system or the like which may result in substantially homogenous materials, substantially concentrated materials, or the like.

In embodiments, an automobile shredder residue sorting system (5) such as an air sorting system, a non-ferrous automobile shredder residue air sorter, an air-locked automobile shredder residue sorting system, a non-magnetic magnetic sorter, a substantially isotropic quantization sorting system, an air-locked Z-box air classifier, low susceptance microparticle separator, a magnetic fuzz separator or sorter, or the like may include a wind tunnel sorting system as shown in FIGS. 1, 2 and 3. A wind tunnel sorting system may provide sorting of materials such as automobile shredder residue or other products from automobile shredder residue (e.g., separated materials, zorba, zurik, or the like) in a fashion which may effectively and even efficiently provide separation of recyclable materials from automobile shredder residue. For example, automobile shredder residue (4), shredder materials (17), or the like may be introduced into a wind tunnel sorting system perhaps at an introduction element (12) so that the materials can be processed in a system. Laminar air flow (7) which may or may not be horizontal may be provided in a system that may influence, perhaps even dynamically influence the materials. Laminar air flow (7) may be path directed air flow to provide path directed air sorting of automobile shedder residue in a sorting system. Influence upon the materials may produce a force resulting in desired sorting effects. Some of the materials may be carried, pushed, or even scattered by the laminar air flow so that any initial vertical gravitationally driven descent may dynamically change perhaps based on the weight of the materials, the force of the air flow, and perhaps even the direction of the air flow. Dynamic influence on the materials may provide categorized collections of the automobile shredder residue as the residue may variably descend in the wind tunnel sorting system. At least one collection of materials (9) may be generated from the system as influenced by the laminar air flow. The collection of materials (9) may include, but is not limited to, recyclable materials, sorted materials, a collection of low susceptance microparticles, a salable output, a salable concentration output of end product waste, a collection of magnetic fuzz, a collection of substantially isotropic quantized materials, a trash output, sorted landfill substances, additional processing substances, or the like. A collection may include those materials that may travel in the air into a cyclone and filtered out and collected.

The materials may be introduced into a sorting system such as a wind tunnel sorting system or the like in any fashion including but not limited to vertically, horizontally, from a top, from a bottom, from a side, diagonally or the like. As shown in FIG. 3, an introduction element (12) may be located at a top of a wind tunnel and may even be an air lock (27) permitting passage of the materials into a wind tunnel system but in which the system may be kept under pressure. After materials are introduced into the wind tunnel system, the materials may gravitationally descend into a wind tunnel (28) perhaps with a gravitationally driven descent (6) as may be understood in FIG. 3. In embodiments, air locks may be provided at or near the collection of sorted materials perhaps even at a bottom of a system.

Sorting of automobile shredder residues in a wind tunnel sorting system may provide sorting of heavier materials from lighter materials. For example, the heavier materials may descend substantially vertically (6) into a collection of heavy materials and even a container element (13) thereof. In some embodiments, a container element (13) may be an example of a collector of sorted materials such as ferrous materials or automobile shredder residue components or the like. The heavy materials may not be influenced by the air flow. However, lighter materials may be dynamically influenced by an air flow and may be pushed or carried downstream perhaps from an introduction section and may be scattered into a plurality of downstream container elements to provide a plurality or even a series (10) of collections (9). As shown in FIG. 3, an example of a descent (6) of a material is shown where the heaviest materials may fall in a substantially vertical (35) fashion and lighter materials may be dynamically influenced by an air flow and carried (8) downstream. The materials may be funneled into a collection area. Accordingly, embodiments of the present invention may provide a series of collections of materials perhaps in a series of containers or conveyer belts where the heavier materials (31) may be collected upstream and the lighter materials (32) may be collected downstream. A container (13), which for purposes of illustration may be placed under an air lock as shown in FIG. 3 and may be any kind of containing or even carrying element to allow collections of materials to be contained and perhaps even transported via a conveyer belt, moving carrier, or the like.

In embodiments, a series of containers may be located at a bottom (33) of a wind tunnel and may even be arranged along a direction of air flow to perhaps provide collection of materials of different weights in each container. The collected materials may include separated heavy materials, separated light materials, separated trash materials, separated mixed heavy materials, or the like. Any number of containers may be used such as but not limited to at least 2, at least 3, at least 4, at least 5, at least 6, at least 7, at least 8, greater than 2, less than 10 containers, more than 10 containers, or the like. At least one container may be used as well depending on the needs of the system.

Heavier materials may include but are not limited to recyclable materials, metals, ferrous metals, nonferrous metals, heavy trash, glass, plastic, wood, aluminum, copper, zinc, brass, lead, stainless steel, and the like; and lighter materials may include but are not limited to trash, magnetic fuzz, dirt, and the like.

Laminar air flow may be a smooth air flow and may be created with an air aligner (19) which may be a plurality of tubes located between an air current source element (20) and a material introduction element (12). An air aligner (19) may be an air path directional guide in some embodiments which may provide guided or even regulated air flow in a sorting system. An air path direction guide may be a non-rotary air flow guide, a laminar flow air guide, a non-circular air flow guide, or even a non-centrifugal air flow guide or the like which can provide path directed air flow, non-rotary air flow, laminar air flow, non-circular air flow, or even non-centrifugal air flow, or the like in a sorting system. The tubes may be steel tubes, plastic tubes, rubber tubes or the like. An air aligner may be positioned so that laminar air flow may be created in a desired direction or even in a direct configuration with a material. Laminar air flow may be streamlined and may be an undisrupted or even substantially turbulent free air flow. An air source element (20) may be a fan, blower, ventilator or even any device which may produce a current of air. Air flow in a wind tunnel system may have an air velocity which may be selected based on the type of materials processed. In some embodiments, a non-limited example of air velocity or even speed may include between about 15 and about 60 miles per hour, between about 15 and about 35 miles per hour, about 28 miles per hour, between about 35 and about 60 miles per hour, about 40 miles per hour, all increments therein, or the like. In some embodiments, a speed of the components in a wind tunnel system may be between about 30 miles per hour and about 40 miles per hour and all increments therein. Of course, any air velocity or speed value may be used and all are meant to be included in the scope of this application. Air velocity of a laminar air flow may be constant or may even be variable. The air velocity may be variably changed during use of the wind tunnel system perhaps that it may be increased or decreased during use. Dwell time of a component in a wind tunnel system may be about 1 second, greater than about 1 second, about 1.5 seconds, about 2 seconds, more than a dwell time of a Z-box air classifier, or the like. Therefore, in some instances, the air flow in a wind tunnel system may be less than that used in a Z-box air classifier, for example an air flow in a wind tunnel system may be between about 30 and about 40 miles per hour where a Z-box air classifier may be about between about 60 and about 80 miles per hour, even 75 miles per hour. Thus, a dwell time of a component therein would be longer in a wind tunnel system than in a Z-box air classifier at those rates. It may be that a Z-box air classifier has a dwell time of less than about 1 second.

In embodiments, an air velocity may have different values at different locations in a wind tunnel sorting system. This may dynamically influence the materials as they may be carried in a laminar air flow and may even provide better separation of the materials. As but one example, an air velocity may be different at a material introduction section (21) than at a downstream section (22). An material introduction section may have an air velocity such as but not limited to between about 15 and about 35 miles per hour, about 28 miles per hour, and between about 25 and about 40 miles per hour, or the like. A downstream section may have an air velocity such as but not limited to between about 35 and about 60 miles per hour, about 40 miles per hour, between about 30 and about 60 miles per hour, and the like. As mentioned above, all options for air velocity may be used and are meant to be included in this disclosure. In providing different air velocities within a wind tunnel, the present invention may utilize an internal volume (23) at or near a material introduction section that may be greater than an internal volume (24) at or near a downstream section. As shown in FIG. 3, six separation sections are provided as a non-limiting example. The horizontal laminar air flow (7) may flow but is not limited to flow from the left to the right influencing materials introduced from the introduction element (12). The heaviest materials may descend almost vertically down (35) into a first collection container. The lighter materials may be carried and may descend into one of the remaining series of containers effectually sorting out the heaviest materials from the lightest materials. The air flow in the downstream sections may be increased by restricting the volume space within the wind tunnel as shown in FIGS. 1 and 3. The housing of a wind tunnel may be narrowed perhaps by lowering a roof section (25) for those sections of the wind tunnel that desire an increase air flow velocity. Adjustment of the housing may be provided perhaps by adjusting the degree to which a roof section may be lowered.

In embodiments, a wind tunnel sorting system may have a rectangular cross section of a wind tunnel. Other shapes may be used such as circular, square, combinations thereof and the like. As shown in FIG. 1, a sorting system (5) with may be an air-locked automobile shredder residue sorting system, a substantially isotropic quantization sorting system, a wind tunnel sorting system, low susceptance microparticle separator, or the like may be a closed loop system perhaps providing continuous circulation of the air flow and even in an air locked system. As mentioned above, an air lock (27) may be provided at a material introduction element and may even be provided where separated materials exit the system such as shown in FIG. 3. Any air lock (27) may be used including but not limited to a rotary airlock, a drop box airlock (with a lid on top and a lid on the bottom), or perhaps even an axial airlock perhaps located at a bottom of a system and even that has one axial air lock instead of multiple ones running perpendicular along a bottom of a system. Axial may be situated along an axis of the system. An air locked system may be important in providing adequate air flow and direction of the air flow within the system. As mentioned earlier, air flow may be generated from an air current source (20) where a fan may blow air through an air aligner (19) to create a horizontal laminar air flow into a wind tunnel (28) of a system. Materials (4, 17) introduced in the introduction element (12) may descend into the wind tunnel and may ultimately be separated into a series of collections of materials. The air flow, after passing through the wind tunnel, may then exit the wind tunnel and may proceed into a cyclone (29). Light materials may remain in the air flow and may even be carried into the cyclone (29). In the cyclone, the light materials may be filtered out to remove the light materials and provide a clean air flow such that a cyclone (29) may be a light material removal element in some embodiments. The filtered air may exit the cyclone and may be channeled (18) back to the air current source (20) perhaps providing a closed loop system, a continuous air flow system or perhaps even recycling with an air recycling element or recirculation element of the air flow within a system.

When separating recyclable materials from automobile shredder residue, embodiments of the present invention provide separating an amount of waste in the automobile shredder residue from recyclable materials. While any amount of separation of waste from recyclable materials is available and all are included in this scope of this application, the amount of waste which may be separated from automobile shredder residue may depend on the type of automobile shredder residue. Thus, perhaps depending on the type of cut size used in a substantially isotropic quantization separation system, the amount of waste may differ. As a non-limiting example, an amount of waste removed from automobile shredder residue may include between about 80% and about 90%, greater than about 75%, less than about 90%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, or the like. In another non-limiting example, an amount of waste removed from automobile shredder residue could be about 20% to about 40%, at least about 20%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, or the like. More waste may be removed from fine sized automobile shredder residue (perhaps up to 95% waste removal) than from medium sized automobile shredder residue (perhaps up to 40% waste removal).

In embodiments, automobile shredder residue may be screened through a sizing element so that particles of the automobiles shredder residue may be separated and even sized into desired cut sizes. This may vary depending on the specific system and any kind of sizing option may be used. As a non-limiting example, automobile shredder residue may be run through a sizing machine, or even a plurality of sizing machines to create perhaps three groups of cut sizes such as large size, medium size, and even fine size. A large size may be between about 2 or about 2.5 inches and about 5 inches, greater than about 2 inches, between about 2 inches and about 7 inches, or the like. A medium size may be between about ⅞ inch and about 2 or about 2.5 inches; and a fine size may be less than about 1 inch, less than about ⅞ inch, about ¾ inch, about ½ inch, or the like. As a non-limiting example, embodiments of the present invention may provide optimal separation of automobile shredder residue when sizes of less than about 2 inches are introduced into a system such as a wind tunnel sorting system.

Some important factors of the present invention may provide decreasing an amount of automobile shredder residue disposal and even increasing an amount of recyclable materials as may be recovered from automobile shredder residue. Recyclable material recovered from automobile shredder residue may include but is not limited to metals, nonferrous metals, ferrous metals, aluminum, copper, zinc, brass, lead, stainless steel, magnesium, nickel, tin, insulated copper wire, zorba, zurik, polymers, plastic, any combination thereof, or the like. As a non-limiting example, between about 5% and about 20%, up to about 10%, up to about 20%, up to about 25%, up to 30% of said automobile shredder residue can be removed as recyclable materials thus reducing landfill and waste and even increasing a recyclable amount of materials.

Since the amount of recyclable materials recovered may be increased, a monetary amount may be associated with the increase based on the systems or methods as discussed herein in the various embodiments. As a non-limiting example, between about $8.00 USD and about $20.00 USD per ton of shredded material may be additionally recovered based on the amount of salable additionally recovered recyclable materials as compared to past techniques. Of course, these values may vary with the market and with the amount of recyclables recovered; however it may provide a substantial increase in salable materials.

As recyclable materials are sorted from automobile shredder residue, they may be sorted as separated materials such as metals, plastics, zorba, zurik, nonferrous trash, any combination thereof and the like. Zorba may be shredded nonferrous scrap of any combination of aluminum, copper, lead, magnesium, stainless steel, nickel, tin, and zinc, in elemental or alloyed (solid) form and may even be resulting material generated by traditional sorting processes such as eddy current, air separation, flotation, screening, or other segregation techniques or a combination thereof. Zurik may be shredded nonferrous sensor sorted scrap of any combination of stainless steel, insulated copper wire, aluminum, copper, lead, magnesium, nickel, tin, and zinc, in elemental or alloyed (solid) form and may even be resulting material generated by computer sensing equipment such as but not limited to induction sensor sorting or X-ray techniques. Other requirements may apply to zorba and zurik such as having been passed through one or more magnets to reduce or even eliminate free iron and/or large iron attachments, perhaps fee of radioactive material, dross, or ash, or the like requirements.

As mentioned herein, embodiments of the present invention may provide a combination of automobile shredder residue sorting systems when recovering recyclable materials from automobile shredder residue. A substantially isotropic quantization sorting system such as a wind tunnel sorting system may be used with any number of traditional sorting systems perhaps as a subsequent sorting system or even as an initial sorting system. Traditional sorting systems may include but are not limited to magnets, eddy current, air puff separation, flotation, screening, sensor sorting, induction sensor sorting, X-ray, any combination thereof, or the like as one skilled in the art would understand. Traditional non-ferrous sorting systems may include but is not limited to eddy current, air puff sensor, Eriez magnetic separator, or the like. Magnets may pull out ferrous materials including ferrous nuggets. Magnets may also attract magnetic fuzz which may be undesirable when trying to separate recyclable ferrous materials. Therefore, processing automobile shredder residue in substantially isotropic quantization sorting systems prior to use with magnetic sorting systems may be desirable to remove materials detrimental to the magnetic sorting system and may provide a cleaner product. This may also apply with zorba and zurik perhaps generated from other systems.

When using sorting systems as a pre-sorting technique, collections of collected materials such as substantially isotropic quantized materials or the like may be further processed and even purified in a subsequent sorting system. Some of the collected materials may be discarded as they may be determined to be substantially non-recyclable materials. The subsequent sorting system may take the recyclable materials or even other collections of materials and efficiently separate metals or even plastics from the collections. Due to the nature of the collections of materials and perhaps even the removal of magnetic fuzz, entanglements, and other trash from the automobile shredder residue with the separation systems, the effectiveness of the subsequent sorting systems may result in cleaner, better, and usable materials for recycling.

When using sorting systems as a post-sorting technique, an initial sorting system may be responsive to automobile shredder residue where it may be initially processed in any of the various traditional sorting systems providing separated materials. At least some recyclable materials may be sorted from the initial sorting system. The separated materials received from the initial sorting system or systems may then be introduced into a specialized sorting system. In embodiments, separated materials may include but are not limited to zorba, zurik, trash, nonferrous trash, automobile shredder residue or the like. Of course, embodiments of the present invention may include both pre-sort and post-sort techniques, re-processing of materials in any of the various sorting systems including a substantially isotropic quantization sorting system and any combination thereof.

FIG. 4 is a block diagram representing a non-limiting example of various embodiments of an overall system. Some of the steps or systems may or may not be used and the order of the steps may be varied as needed. As mentioned above, an automobile shredder and metal reclamation process may include shredder materials (26) processed in an automobile shredder system (1) providing a plurality of shredded pieces (2). The shredded pieces may be sorted and a collection of ferrous metals (3) may be recycled (30) leaving a plurality of automobile shredder residue (4) behind. This may be a ferrous recovery system (40). Thereafter, automobile shredder residue may be processed in a non-ferrous recovery system (41). The automobile shredder residue (4) may be sized (34) and may even be processed through a traditional perhaps even an initial sorting system (16) to provide separated materials (17) from the initial sorting system (16). At least some of the separated materials (17) such as traditional recyclable materials may be recycled (30). At least some of the separated materials (17) could be traditional end product waste which in the past could be considered trash and may have been sent to a landfill (42). At least some, if not all, of the separated materials (17) such as traditional end product waste or even the automated shredder residue (4) or even sized (34) automated shredder residue may be processed perhaps by sorting in a sorting system (5) such as but not limited to an air-locked automobile shredder residue sorting system, an end product waste sorter, a substantially isotropic quantization separation system, a wind tunnel sorting system, or the like to provide a collection, or even a series of collections of materials (9) and perhaps even recovery of recyclable materials of traditional end product waste. Therefore, in some embodiments, what could in the past be considered trash may be processed (43) by perhaps shipping from an original sorting facility (44) to a separate sorting facility (15) for additional processing of substances, or the like. Processing (43) may be any step of taking materials (9) and providing them for subsequent sorting (15). At least some of the collected materials (9) may be recycled (30) or some of the collected materials (9) may be shipped to a landfill (42). At least one of the collections of materials (9) may be processed in a subsequent sorting system (15) to provide recyclable materials (36) from the subsequent sorting system (15). As represented in FIG. 5, a subsequent sorting system (15) may provide traditional sorting processes or may even provide sorting systems as described herein. Processing with subsequent sorting systems may be by a separate sorting facility (45) or could even be by a same sorting facility. The recyclable materials (36) may be recycled (30). Recycling may be with a recycle element as one skilled in the art would understand. Embodiments of the present invention may provide an automated system or even a partially automated system where each of the process steps may be accomplished in an automated or even partially automated fashion. Movement of materials from one step to another may be accomplished by manual labor, conveyer belts, truck transportation, and the like.

As can be easily understood from the foregoing, the basic concepts of the present invention may be embodied in a variety of ways. It involves both automobile shredder residue sorting techniques as well as devices to accomplish the appropriate automobile shredder residue sorter. In this application, the automobile shredder residue sorting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "collection" should be understood to encompass disclosure of the act of "collecting"—whether explicitly discussed or not—and, conversely, were there effectively disclosure of the act of "collecting", such a disclosure should be understood to encompass disclosure of a "collection" and even a "means for collecting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the sorting devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) the related methods disclosed and described, xxvi) similar, equivalent, and even implicit variations of each of these systems and methods, xxvii) those alternative designs which accomplish each of the functions shown as are disclosed and described, xxviii) those alternative designs and methods which accomplish each of the functions shown as are implicit to accomplish that which is disclosed and described, xxix) each feature, component, and step shown as separate and independent inventions, and xxx) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. All claims are incorporated into the specification of this application and the dependent claims of the incorporated claims are hereby amended to include the phrase, "or any other claim." The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of separation of automobile shredder residue comprising the steps of:
providing automobile shredder residue as a result from a ferrous sorting recovery system;
introducing said automobile shredder residue into an automobile shredder residue sorting, non-ferrous recovery system;
non-magnetically sorting magnetic fuzz from said automobile shredder residue with said automobile shredder residue sorting, non-ferrous recovery system;
wherein said sorted magnetic fuzz is substantially free of recyclable materials.

2. A method of separation of automobile shredder residue according to claim 1 wherein said step of non-magnetically sorting magnetic fuzz from said automobile shredder residue with said automobile shredder residue sorting, non-ferrous recovery system comprises the step of substantially sorting selected magnetic fuzz from automobile shredder residue.

3. A method of separation of automobile shredder residue according to claim 1 and further comprising the steps of:
separately collecting said magnetic fuzz from said automobile shredder residue as a result of said non-magnetically sorting with said automobile shredder residue sorting, non-ferrous recovery system; and
separately collecting at least two collections of sorted materials, at least one of which consists of substantially magnetic fuzz free materials.

4. A method of separation of automobile shredder residue according to claim 1 wherein said step of non-magnetically sorting magnetic fuzz from said automobile shredder residue comprises the step of separating light magnetic fuzz from said automobile shredder residue.

5. A method of separation of automobile shredder residue according to claim 1 wherein said automobile shredder residue sorting, non-ferrous recovery system comprises a wind tunnel sorting system.

6. A method of separation of automobile shredder residue according to claim 2 wherein said step of non-magnetically sorting magnetic fuzz from said automobile shredder residue comprises the step of path directed air sorting said automobile shredder residue.

7. A method of separation of automobile shredder residue according to claim 3 and further comprising the step of collecting said magnetic fuzz and each of said at least two collections of sorted materials in separate containers.

8. A method of separation of automobile shredder residue according to claim 7 wherein said substantially magnetic fuzz free components comprises an amount of magnetic fuzz selected from a group consisting of: less than about 10%, less than about 9%, less than about 8%, less than about 7%, less than about 6%, less than about 5%, less than about 4%, less than about 3%, less than about 2%, and less than about 1% volume of magnetic fuzz.

9. A method of separation of automobile shredder residue according to claim 2 wherein said step of substantially sorting said selected magnetic fuzz from said automobile shredder residue comprises the step of single stage sorting said selected magnetic fuzz from said automobile shredder residue.

10. A method of separation of automobile shredder residue according to claim 5 and further comprising the step of providing a substance dwell time in said wind tunnel sorting system selected from a group consisting of a dwell time that is greater than a dwell time of a Z-box air classifier system, about a 1 second dwell time, greater than about 1 second dwell time, about 1.5 second dwell time, and about 2 seconds dwell time.

11. A method of separation of automobile shredder residue according to claim 5 and further comprising the step of flowing vertical air in said wind tunnel sorting system.

12. A method of separation of automobile shredder residue according to claim 2 wherein said step of substantially sorting selected magnetic fuzz from automobile shredder residue comprising the step of sorting with an air-locked automobile shredder residue sorting, non-ferrous recovery system.

13. A method of separation of automobile shredder residue according to claim 1 wherein said step of non-magnetically sorting magnetic fuzz from said automobile shredder residue with said automobile shredder residue sorting, non-ferrous recovery system comprises the step of non-magnetically sorting separating low susceptance microparticles from said automobile shredder residue with said automobile shredder residue sorting, non-ferrous recovery system.

14. A method of separation of automobile shredder residue according to claim 1 wherein said automobile shredder residue sorting, non-ferrous recovery system comprises a closed system.

15. A method of separation of automobile shredder residue according to claim 1 and further comprising the step of providing a cyclone in said automobile shredder residue sorting, non-ferrous recovery system.

16. A method of separation of automobile shredder residue according to claim 5 and further comprising the step of flowing horizontal air in said wind tunnel sorting system.

17. A method of separation of automobile shredder residue according to claim 12 wherein said air-locked automobile shredder residue sorting, non-ferrous recovery system comprises a closed loop air-locked automobile shredder residue sorting, non-ferrous recovery system.

18. A method of separation of automobile shredder residue according to claim 1 wherein said step of introducing said automobile shredder residue into an automobile shredder residue sorting, non-ferrous recovery system comprises the step of introducing sized automobile shredder residue into said automobile shredder residue sorting, non-ferrous recovery system.

19. A method of separation of automobile shredder residue according to claim 18 wherein said sized automobile shredder residue comprises a size selected from a group consisting of less than about 3 inches, less than about 2.5 inches, less than about 1 inch, and less than about ⅞ inch.

20. A method of separation of automobile shredder residue according to claim 5 and further comprising the step of providing flowing air in said wind tunnel system at a speed between about 30 mph and about 40 mph.

21. A method of separation of automobile shredder residue according to claim 6 wherein said step of path directed air sorting said automobile shredder residue comprises the step of horizontal path directed air sorting said automobile shredder residue.

22. A method of separation of automobile shredder residue according to claim 6 wherein said step of path directed air sorting said automobile shredder residue comprises the step of vertical path directed air sorting said automobile shredder residue.

* * * * *